United States Patent [19]

Lonning

[11] B 3,985,693

[45] Oct. 12, 1976

[54] POLYVINYL CHLORIDE POLYBLEND MOLDING COMPOSITION

[75] Inventor: Thor J. G. Lonning, Suffield, Conn.

[73] Assignee: Monsanto Company, St. Louis, Mo.

[22] Filed: June 27, 1974

[21] Appl. No.: 483,865

[44] Published under the second Trial Voluntary Protest Program on January 13, 1976 as document No. B 483,865.

[52] U.S. Cl. .................... 260/23 XA; 260/29.7 UP; 260/876 R
[51] Int. Cl.² ........................................ C08F 19/08
[58] Field of Search .......... 260/23 XA, 876 R, 29.7, 260/29.7 UP

[56] References Cited
UNITED STATES PATENTS 2,802,808   8/1937   Hayes................................ 260/876 R
3,636,138   1/1972   Beer ............................ 260/29.7 UP

*Primary Examiner*—Donald E. Czaja
*Assistant Examiner*—S. M. Person
*Attorney, Agent, or Firm*—Joseph S. Nelson; William J. Farrington; James C. Logomasini

[57] ABSTRACT

Polyblends of a vinyl chloride polymer having good low temperature crack propagation resistance, overall toughness and high resiliency comprising a polyvinyl chloride polymer and a two stage core grafted composite copolymer having a particular butadiene-styrene rubbery substrate. The composite graft copolymer is blended with a matrix of a polyvinyl halide resin and modified with a plasticizer, stabilizer and lubricant system to provide the desired tough rubbery polyblends for molding.

20 Claims, No Drawings

POLYVINYL CHLORIDE POLYBLEND MOLDING COMPOSITION

BACKGROUND OF THE INVENTION

Characteristically plasticized polyvinyl chloride compositions, when in the form of molded articles, have relatively low toughness and crack propagation resistance at low temperatures.

In recent years, rigid polyblends of polyvinyl chloride (PVC) with rubbers and grafted rubbers have been developed to improve the toughness of PVC compounds. Rigid PVC polyblends with rubbers grafted with styrene and acrylonitrile were disclosed by Hayes in U.S. Pat. No. 2,802,809 granted Aug. 13, 1957. More sophisticated grafted rubbers have been developed for rigid PVC polyblends to improve their transparency for rigid vinyl bottles as disclosed by Beer in U.S. Pat. No. 3,636,138 granted July 18, 1972.

Currently, there is a great need for molded shoe parts, in particular, the soles and heels to provide shoe components that are economically manufactured and fabricated into shoes. A recent development has been the Unit-Sole or unitary sole and heel injection molded in the shape of a sole and heel. Such Unit Soles are combined with molded or fabricated uppers by adhesives to provide an attractive article of footwear at low fabricating costs. Unitary sole-heel articles have been molded of plasticized vinyl compounds but such moldings have relatively low flex crack endurance and low coefficients of friction for shoe soles. Block copolymers of butadiene and styrene have been used extensively but have relatively poor moldability and pliability and dimensional stability along with poor adhesion having to be chlorinated to establish adequate bonds. Polyurethane moldings have been developed that have high flex crack endurance but slow molding rates.

There has now been discovered a new and very useful plasticized polyvinyl chloride polyblend composition that can readily be injection molded into articles that are tough and resilient yet have high flex crack endurance over a wide temperature range. Such articles can be unitary shoe-heel moldings or other articles requiring tough, resilient, rubbery properties such as bumper guards and other impact absorbing elements.

These unusual flex-crack properties are gained without substantially affecting various other physical properties of the polyblend such as tensile strength, elongation to fail, impact strength and the like as compared to the known prior art materials cited and in particular plasticized vinyls or semi-rigid vinyls. The polyblends provide a superior coefficient of friction, low mold shrinkage, good adhesion, greater flex crack resistance at low temperatures and excellent moldability. Within the properties needed the composition can be varied providing a range of properties such as hardness and resiliency that allows the composition to be tailored to exacting uses.

The present invention relates to a polymer composition comprising:

A. a polyvinyl chloride polymer being characterized by having an inherent viscosity of from about 0.7 to 1.5 in a 0.2 weight percent cyclohexanone solution at about 25° to 30°C., said polyvinyl chloride polymer comprising a polymer selected from the group consisting of homopolyvinyl chloride and polyvinyl chloride copolymers having up to 25 weight percent of another ethylenically unsaturated comonomer polymerizable therewith, B. a butadiene-styrene rubbery substrate having a butadiene content of 68 to 95 percent by weight and a styrene content of 5 to 32 percent by weight based on the total weight of the butadiene-styrene rubbery substrate which rubbery substrate is further characterized as having a particle size in the range of from 0.06 to 0.2 micron, a gel content in the range of from 40 to 95 percent, a swelling index in the range of from 10 to 40, and a second order transition temperature (Tg) less than −40°C.

C. a superstrate grafted onto the rubber substrate which superstrate comprises:
  1. the polymerization product of a first polymerizable monomer composition comprising:
      a. from 0.1 to 2 percent by weight of a nonconjugated diolefin monomer,
      b. from 20 to 30 percent by weight of an ethylenically unsaturated nitrile selected from the group consisting of acrylonitrile, and mixtures of acrylonitrile and methacrylonitrile which contain up to 20 percent by weight of methacrylonitrile;
      c. from 40 to 60 percent by weight of a vinylidene aromatic hydrocarbon monomer selected from the group consisting of styrene and alpha methyl styrene,
      d. from 20 to 50 percent by weight of methyl methacrylate; and
  2. a second polymerizable monomer composition comprising from 55 to 85 percent by weight of an ethylenically unsaturated nitrile monomer selected from the group consisting of acrylonitrile and mixtures of acrylonitrile and methacrylonitrile which contains up to 20 percent by weight of methacrylonitrile based on the total weight of acrylonitrile and methacrylonitrile and from 15 to 45 percent by weight of a monovinylidene aromatic hydrocarbon monomer wherein the percent by weight is based on the total weight of the monomers in the second polymerizable monomer mixture;

wherein the grafted superstrate contains a total of at least 40 percent by weight ethylenically unsaturated nitrile monomer and wherein the ratio of grafted superstrate to substrate is in the range of from 15-200:100, D. a plasticizer system for said polymer composition, said plasticizer system being present in a sufficient amount to produce in said polymer composition after such is heat fused at a temperature of from about 120° to 215°C., a Shore A hardness value in the range of from about 45 to 95 at about 23°C., E. a stabilizer system for said polymeric composition, said stabilizer system being present in such amounts as to substantially prevent the thermal degradation of said polymeric composition during heat fusion for 5 to 15 minutes at temperatures in the range of from about 120° to 215°C., and F. a lubricant system present in such amounts as to permit the release of said polymeric composition from a heated solid surface after said polymeric composition has been heat fused at temperatures in the range of from about 120° to 215°C.

DESCRIPTION OF THE PREFERRED EMBODIMENTS

VINYL CHLORIDE MATRIX POLYMER

Vinyl chloride polymers used in the polyblends of this invention are broadly described above. These resins are well known in the art and generally any such resin having the properties indicated can be used as a matrix resin for blending with the particular graft copolymer used in this invention to form the polyblend compositions.

Homopolymers of vinyl chloride monomer are preferred, however, copolymers of vinyl chloride and other ethylenically unsaturated comonomers can be used. Generally, the amount of comonomers should not exceed about 25 percent by weight of the copolymer and preferably should not exceed 15 percent by weight thereof.

Ethylenically unsaturated monomers which may be interpolymerized with the vinyl halides include vinylidene halides such as vinylidene chloride; vinyl esters such as vinyl acetate; acrylic and alpha-alkyl acrylic acids such as acrylic and methacrylic acids; the alkyl esters of such acrylic and alkylacrylic acids such as methyl acrylate, ethyl acrylate, methyl methacrylate; amides of acrylic and alkyl-acrylic acids such as acrylamide, methacrylamide; unsaturated nitriles such as acrylonitrile, methacrylonitrile, ethacrylonitrile; monovinylidene aromatic hydrocarbons such as styrene and alpha-alkyl styrenes; dialkyl esters of maleic acid such as dimethyl maleate and the corresponding fumarates; vinyl alkyl ethers and ketones; ethylene; and other ethylenically unsaturated compounds copolymerizable with the vinyl halides. Mixtures of compounds exemplified by the foregoing materials may also be useful to form the vinyl halide polymer.

The method used to prepare the vinyl halide resins may be any which is commonly practiced in the art; the polymerization may be effected en masse, in solution or with the monomer in an aqueous dispersion. From the standpoint of economics and process control, highly suitable polymers can be prepared by a method in which the monomer reactants are suspended in water. Other variations upon the polymerization method may also be utilized in order to vary the properties of the product, one example of which is polymerization at relatively high temperatures which normally produces polymers having low shear characteristics. Highly fluid resins can also be prepared by utilizing a technique in which the monomer charge or a portion thereof is continuously fed to the reaction vessel, which is believed to promote branching. Polyvinyl chloride polymers preferred by the process disclosed in U.S. Pat. No. 3,523,111 issued to A. A. Bibeau et. al. are generally preferred.

It is preferred to use vinyl halide polymers as starting materials which are in the form of particles at least 90 weight percent of which pass through a 40 mesh USBS sieve.

STABILIZERS

Those skilled in the art will readily appreciate that polyblends of this invention can employ any conventional stabilizer system having properties as above indicated. Many different stabilizers and stabilizer combinations are known; see, for example, listing and descriptions given in the 1972–1973 issue of Modern Plastics Encyclopedia, pages 475–485. One presently preferred stabilizer system consists of a combination of barium/cadmium fatty acid (Mark 1260 Argus Chemical Corporation), alkyl aryl phosphates (Mark C Argus Chemical Corporation) and 4,4'-butylidene-bis-(6-t Butyl-m-cresol)(e.g. Santowhite Powder (Monsanto Company)).

LUBRICANTS

Those skilled in the art will readily appreciate that polyblends of this invention can employ any conventional lubricant system having properties as above indicated. Many different lubricants and lubricant combinations are known, such as fatty acids, fatty acid salts and esters, paraffinic waxes, and the like. One presently preferred lubricant is a stearic acid (Wittco Chemical Company).

PLASTICIZERS

Those skilled in the art will readily appreciate that polyblends of this invention can employ any conventional plasticizer system having properties as above indicated. Many different plasticizers and plasticizer combinations are known; see, for example, listing and descriptions given in the 1973 issue of Modern Plastics Encyclopedia, pages 463–474. A group of preferred plasticizers are those plasticizer systems providing good low temperature crack propagation resistance at −20°F. according to ASTM D-1052, e.g. those selected from dibasic and tribasic esters with straight and branched chain alkyl alcohols having 3 to 13 carbon atoms preferably those selected from the group consisting of adipate, phthalate and trimellitate esters with straight and branched chain alkyl alcohols having 3 to 13 carbon atoms and mixtures thereof such as di(n-octyl decyl) phthalate, di(undecyl) phthalate, di(n-octyl n-decyl) adipate, di(isodecyl) adipate, dioctyl adipate, heptyl nonyl adipate, heptyl nonyl trimellitate, di(isodecyl) phthalate. A most preferred plasticizer is di(heptyl, nonyl, undecyl) phthalate (Santicizer 711, Monsanto Company, St. Louis, Missouri). The plasticizer system is necessarily compatible with the polyblend in the range of 50 to 90 parts per 100 parts of resin providing a range of Shore A hardness values from about 45 to 95 at about 23°C., preferably about 50 to 75 at about 23°C. The Shore A hardness values are determined by tests according to ASTM D-676. The plasticizer system provides good low temperature properties for the polyblends and, in particular, provides less than 100% crack propagation at −20°F. after 2000 Ross Flex cycles on a specimen having a 1/10 inch notch as tested in accordance with ASTM D-1052. The above crack propagation resistance test is used as a standard for the industry relative to materials to be used in unitary soles and heels. The polyblends of the present invention show preferably 0 to 10% crack propagation after 2000 Ross Flex cycles.

ADDITIVES

Optionally, if desired, one may incorporate into polyblends of this invention, in addition to the above components, minor amounts (usually less than about 15 weight percent (total composition basis) of conventional additives, such as colorants, fillers, processing aids, flame retardants, foaming agents and the like.

THE BUTADIENE-STYRENE SUBSTRATE

Nature of the Rubber Polymer Substrate

The particular butadiene-styrene rubbery polymer substrate onto which the monomers are grafted are copolymers of butadiene and styrene which contain from 68 to 95 percent of butadiene and correspondingly from 5 to 32 percent by weight of styrene based on the weight of the butadiene-styrene copolymer. Optionally, up to 5 percent by weight of the butadiene may be replaced with a nitrile monomer such as acrylonitrile or methacrylonitrile.

The butadiene-styrene rubbery substrate must have a particle size in the range of from 0.06 to 0.2 microns before grafting, a gel content in the range of from 40 to 95 percent, a swelling index in the range of from 10 to 40, and a second order transition temperature (Tg) less than −20°C. and preferably less than −40°C. as determined by ASTM Test D-746-52T. The above specified rubber particle size, gel content, swelling index and second order transition temperature is required in order to provide optimum properties.

The Polymerizable Monomer Compositions of the Superstrate

The first polymerizable monomer composition comprises (1) from 0.1 to 2 percent by weight, preferably 0.1 to 1 percent by weight, of a nonconjugated diolefin monomer, (2) from 0 to 30 percent by weight of an ethylenically unsaturated nitrile selected from the group consisting of acrylonitrile, and mixtures of acrylonitrile and methacrylonitrile which contain up to 20 percent by weight methacrylonitrile, (3) from 40 to 60 percent by weight of a vinylidene aromatic hydrocarbon monomer, and (4) from 20 to 50 percent by weight of an alkyl ester of acrylic or methacrylic acid wherein the alkyl group contains from 1 to 8 carbon atoms, wherein the percent by weight referred to above is based on the total weight of the first polymerizable monomer mixture.

The nonconjugated diolefins employed in the practice of this invention are monomers which have two nonconjugated ethylenically unsaturated double bonds per molecule, such that at least one double bond reacts readily causing the diolefin to interpolymerize with the other monomers used in the first polymerizable monomer formulation. Preferably, these diolefins have two ethylenically unsaturated double bonds with a different degree of reactivity or having a crosslinking efficiency of less than one. These diolefins may be aliphatic, aromatic, aliphatic-aromatic, heterocyclic, cycloaliphatic, etc. Examples of suitable diolefins would include divinyl benzene, ethylene dimethacrylate, ethylene glycol dimethacrylate, triethylene glycol dimethacrylate, tetraethylene glycol dimethacrylate, polethylene glycol dimethacrylate, allyl methacrylate, diallyl fumarate, diallyl maleate, vinyl crotonate, and nonconjugated alpha, omega diolefins of at least 5 carbon atoms such as 1,4-pentadiene, 1,7- octadiene; etc. Ethylene glycol dimethacrylate is the preferred difunctional monomer.

Exemplary of the monovinylidene aromatic hydrocarbons which are used in the superstrate are styrene, alpha-methylstyrene, ring-substituted alkyl styrenes, e.g. vinyl toluene, o-ethylstyrene, p-ethylstyrene, 2,4-dimethylstyrene, etc.; ring-substituted halostyrenes, e.g. o-chlorostyrene, p-chlorostyrene, o-bromostyrene, 2,4-dichlorostyrene, etc.; ring-alkyl, ring-halo-substituted styrenes, e.g. 2-chloro-4-methylstyrene, 2,6-dichloro-4-methylstyrene, etc.; vinyl naphthalene; vinyl anthracene, etc. The alkyl substituents generally have 1 to 4 carbon atoms and may include isopropyl and isobutyl groups. Mixtures of the above monovinylidene aromatic monomers may be employed. Styrene and alpha methyl styrene are preferred.

The alkyl esters of acrylic and methacrylic acids used in the first polymerizable monomer composition are those wherein the alkyl group contains from 1 to 8 carbon atoms, e.g. methyl, ethyl, propyl, butyl, 2-ethylhexyl, etc. Examples of such esters include methyl acrylate, ethyl acrylate, butyl acrylate, methyl methacrylate, butyl methacrylate, 2-ethyl hexylmethacrylate, etc. The preferred ester is methyl methacrylate. A particularly preferred first polymerizable monomer composition contains (1) 0.1 to 2 percent by weight of ethylene glycol dimethacrylate; (2) 20 to 30 percent by weight of acrylonitrile; (3) 40 to 60 percent by weight of styrene; and (4) 20 to 50 percent by weight of methyl methacrylate; wherein the percent by weight referred to above is based on the total weight of the first polymerizable monomer mixture.

The second polymerizable monomer composition contains from 55 to 85 percent by weight of an ethylenically unsaturated nitrile monomer selected from the group consisting of acrylonitrile and mixtures of acrylonitrile and methacrylonitrile which contains up to 20 percent by weight of methacrylonitrile based on the total weight of acrylonitrile and methacrylonitrile.

The second polymerizable monomer composition contains from 1 to 45 percent by weight of a monovinylidene aromatic hydrocarbon monomer of the type referred to above. Up to 10 percent of the monovinylidene aromatic hydrocarbon monomer can be replaced with a vinylidene monomer selected from the group consisting of alkyl vinyl ethers wherein the alkyl group contains from 1 to 4 carbon atoms, vinyl esters such as vinyl acetate and alkyl esters of acrylic and methacrylic acids wherein the alkyl groups contain from 1 to 8 carbon atoms.

The preferred monovinylidene aromatic hydrocarbons are styrene and alpha methylstyrene.

The preferred vinylidene monomers, which are used to replace up to 10 percent by weight of the monovinylidene aromatic hydrocarbon, include methyl vinyl ether, ethyl vinyl ether, methyl acrylate, ethyl acrylate, butyl acrylate and the corresponding methacrylates, especially methyl methacrylates.

The percent by weight referred to above in regard to the second monomer mixture is based on the total weight of the monomers in the second monomer mixture.

The Graft Polymerization Process

Although the method of the present invention has previously been described as being conducted with two distinct polymerization monomer formulations in two separate polymerization steps, it should be appreciated that the two steps can be blended into each other. Accordingly, the two formulations can be blended into each other in a process where monomers are added during the course of polymerization. In such a technique, the first monomer formulation would be provided by the monomers present initially during the first stage grafting reaction and thereafter the second stage monomer formulation would be added during the course of the polymerization reaction to provide the equivalent of the second or high nitrile monomer polymerizable formulation as the grafting reaction progressed.

The amount of the first polymerizable monomer composition relative to the amount of substrate may vary fairly widely depending upon the efficiency of the grafting reaction and the composition of the formulation. As previously indicated, of the total graft superstrate provided by the two monomer compositions, at least 40 percent by weight must be formed from ethylenically unsaturated nitrile monomer. The weight ratio of the first monomer formulation to substrate will normally be about 15–150:100 parts by weight, and preferably about 25:120:100. It is essential that the superstrate to substrate ratio resulting from the polymerization of the first monomer formulation be at least 10:100 and preferably about 20–90:100. It is generally desirable to minimize the amount of ungrafted polymer formed from the first polymerizable monomer mixture.

The ratio of the second polymerizable composition to rubbery polymer substrate also may vary fairly widely depending upon the amount of superstrate produced by the first polymerizable composition in view of the requirement that the nitrile monomer content comprise at least 40 percent by weight of the total graft superstrate. Generally, the ratio of the second monomer composition to rubber substrate will be about 20–250:100 and preferably about 40–150:100. For economy of operation, the grafting reaction is ideally conducted under relatively efficient conditions so as to minimize the amount of ungrafted interpolymer which is formed.

Various techniques are customarily employed for graft polymerizing the monomers of the superstrate onto the rubbery polymer substrate including mass suspension, solution and emulsion polymerization techniques, and combinations thereof. Emulsion and suspension polymerization techniques have proven particularly useful.

In the emulsion graft polymerization process, the monomers and rubbery substrate are emulsified in a relatively large volume of water by use of suitable emulsifying agents such as fatty acid soaps, alkali metal or ammonium soaps of high molecular weight alkyl or alkaryl sulfates and sulfonates, mineral acid salts of long chain aliphatic amines, etc. Emulsifying agents which have proven praticularly advantageous are sodium oleate, sodium, palmitate, sodium stearate, sodium lauryl sulfate and other sodium soaps. Generally, the emulsifying agent is provided in amounts of about 1 to 10 parts by weight per 100 parts by weight of the monomers. The amount of water in which the monomers and rubbery polymer substrate are emulsified may vary depending upon the emulsifying agent, the polymerization conditions and the particular monomers. Generally, the ratio of water to monomer with alkali metal soaps will fall within the range of about 80–300:100, and preferably about 150–250:100. The aqueous latex formed in the emulsion polymerization of the rubbery polymer substrate may provide the aqueous medium into which the monomers are incorporated with or without additional emulsifying agents, etc. However, the rubbery polymer may be dispersed in the monomers and the mixture emulsified, or a latex thereof may be separately prepared.

Although actinic radiation and both water-soluble and monomer-soluble peroxy-type and perazo-type catalysts with or without a reducing agent to form a redox system may be employed for the graft polymerization reaction, it has been found highly advantageous to use a redox system with a water-soluble catalyst for emulsion polymerization reactions. Redox systems off the advantage of permitting the use of slower catalysts with equivalent conversion periods.

Exemplary of the water-soluble peroxy catalysts are the alkali metal peroxides; the alkali metal and ammonium persulfates, perborates, peracetates and percarbonates; and hydrogen peroxide. Exemplary of the monomer-soluble peroxy and perazo compounds are di-tert-butyl peroxide, di-benzoyl peroxide, di-lauroyl peroxide, di-oleyl peroxide, di-toluyl peroxide, di-tert-butyl diperphthalate, di-tert-butyl peracetate, di-tert-butyl perbenzoate, dicumyl peroxide, di-tert-butyl peroxide, di-iso-propyl peroxy dicarbonate, 2,5-dimethyl-2,5 di(tert-butylperoxy) hexane, 2,5-dimethyl-2,5-di(-tert-butyl peroxy) hexyne-3, di-tert-butyl hydroperoxide, cumene hydroperoxide, p-menthane hydroperoxide, cyclopentane hydroperoxide, diisopropylbenzene hydroperoxide, p-tert-butyl cumene hydroperoxide, pinane hydroperoxide, 2,5-dimethylhexane, 2,5-dihydroperoxide, etc.; azo-diisobutyonitrile; and mixtures thereof.

The catalyst is generally included within the range of 0.001 to 1.0 percent by weight, and preferably on the order of 0.005 to 0.5 percent by weight of the polymerizable material, depending upon the monomers and the desired polymerization cycle.

Exemplary of the reducing agents which may be employed are alkali metal and ammonium sulfites, hydrosulfites, metabisulfites, thiosulfates, sulfinates, alkali metal formaldehyde sulfoxylates, ascorbic acid, dioxyacetone, dextrose, etc. Various other reducing agents for redox systems may also be employed. The amount of reducing agent will be about 0.001 to 1.0 percent by weight, and preferably on the order of 0.005 to 0.5 percent by weight of the polymerizable monomer formulation, depending on the catalyst and the amount thereof. Minute amounts of activators or promoters such as ferrous salts and copper salts may be included in the redox systems.

Molecular weight regulators may be included in the formulation for the graft polymerization reaction so as to control the molecular weight and achieve the desired properties. Exemplary of such molecular weight regulators are alkyl mercaptans and terpenes, specifically N-dodecyl mercaptan, tert-dodecyl mercaptan, n-butyl mercaptan, isopropyl mercaptan, terpinolene, d-limonene, etc., or their blends.

The particular polymerization conditions employed will vary with the monomer formulation, the catalyst and the polymerization technique. Generally, the reaction will increase with an increase in temperature although a limiting factor is possible deterioration in product properties and also a tendency to produce problems in maintaining latex stability. Generally, temperatures of about 30° to 100° Centigrade and pressures of about 0 to 50 p.s.i.g. have been found suitable for a fairly efficient emulsion graft polymerization reaction. Preferably, an inert atmosphere is employed over the polymerizing latex.

After the polymerization reaction has proceeded to the desired degree of conversion of the monomers, which will normally be more than 90 percent, any unreacted monomers should be stripped. After the graft polymerization, the graft copolymer blend may be recovered from emulsion by various techniques of coagulation in the form of a crumb, or by evaporation, and is washed for subsequent processing. Alternatively, the latex may be combined with a latex of the matrix polymer and coagulated or spray dried therewith. The amount of ungrafted interpolymers produced by the graft polymerization reaction will vary with the type and efficiency of the graft reaction and the ratio of monomer formation to rubbery polymer substrate in the charge. By these factors, the amount of ungrafted polymer in an emulsion reaction will normally vary within the range of about 10 to 150 parts of grafted rubbery polymer substrate with the higher ratios being produced by high monomer/substrate charges.

PROCESSING

The vinyl chloride polymer and various additives can be preblended before being admixed together into a composition of the invention, or not, as desired. Preblending can be accomplished by simple, conventional physical mixing using, for example, a ribbon blender, or the like.

The blends of this invention can conveniently be made either by intensive mechanical mixing without fusion in powder form, or by mechanical mixing with heat-fusion followed by dicing (or other equivalent procedure of particulation).

When using the latter technique, it is convenient and preferred to prepare a preblend mixture of starting materials by mechanically mixing same, and then to subject such preblend for a short period of time to further mixing at a temperature above the fusion (melting) temperature of the resinous (polymeric) components (starting materials) to homogenize same. This homogenizing procedure may be performed on a 2-roll rubber mill until the polymer fuses and a rolling bank is formed. The toll temperatures are maintained at about 160° to 180°C. throughout the mixing operation. Alternatively, such a preblend may be homogenized and fused in a Banbury Mixer.

When preparing a non-fused powder blend, vinyl chloride polymer graft copolymer and plasticizer systems (plus optional additives) are conveniently mechanically blended in an intensive mixer, such as a Henschel Mixer, or the like.

In general, a compression molded slab of a blend of this invention should, when subsequently statically exposed in an air oven, demonstrate a substantial freedom from discoloration after 5 to 15 minutes at 120° to 215°C. at atmospheric pressure.

To form a molded article from a polyblend such is first heat-fused. Heat fusion may be conventionally accomplished by any convenient means, but preferably one employs temperatures ranging from about 170° to 215°C. The apparatus used, for example, may be:
 a. a Banbury Mixer,
 b. a two-roll mill,
 c. an extruder, especially a screw type,
 d. a screw injection molding machine,
or the like, as those skilled in the art will appreciate.

Molded articles are conveniently made from blends of the invention by most preferably injection molding same at temperatures generally ranging from about 120°C. to 215°C. depending upon quantity of plasticizer employed in a given blend.

The dispersed particle size distribution of the substrate in the case of the graft copolymer is conveniently measured for purposes of the present invention by the use of either angular dependent light scattering or centrifugal photosedimentometry.

One preferred class of products of the present invention comprises heat-fused polyblends of vinyl halide polymer and graft copolymer all as herein above described, which have been heat-fused and injection molded into unitary sole-heel articles for footwear fabrication.

For purposes of the present invention, it is generally preferred to employ in polyblends of this invention utilizing a higher molecular weight vinyl halide polymer a lower quantity of the graft copolymer than when one is using a lower (or medium) molecular weight vinyl halide polymer. In this connection, the term "higher" as used herein in reference to the molecular weight of a vinyl halide polymer indicates such a polymer which has an inherent viscosity greater than about 1.1 in a 0.2 weight percent cyclohexanone solution at about 25° to 30°C.; "lower" and "medium" molecular weight vinyl halide polymers fall below such inherent viscosities. Thus, for example, in a polyblend utilizing such a high molecular weight vinyl halide polymer (not including stabilizer(s), plasticizer(s), or lubricant(s), a typical preferred composition is as follows:

| material | weight percent (100% basis) |
|---|---|
| polyvinyl chloride resin (higher molecular weight) | 65 |
| graft copolymer | 35 |

Similar, for another example, in a polyblend utilizing a lower (or medium) molecular weight vinyl halide polymer (not including stabilizer(s), plasticizer(s), or lubricant(s), a typical preferred composition is as follows:

| material | weight percent (100% basis) |
|---|---|
| polyvinyl chloride resin (lower (or medium) molecular weight) | 55 |
| graft copolymer | 45 |

Compositions of a polyblend of this invention are expressed in parts by weight per 100 parts of the polymer constituents (PHR) unless otherwise indicated. Additives, stabilizers, plasticizers, lubricants, and the like are expressed in parts per hundred parts of the polyblended polymers unless otherwise indicated.

The polymer composition then can comprise on a blending and processing basis:
A. from about 50 to 80 parts by weight of a homopolyvinyl chloride, said homopolyvinyl chloride polymer being characterized by having an inherent viscosity of from about 0.70 to 1.5 in a 0.2 weight percent cyclohexanone solution at about 25° to 30°C.,
B. from about 20 to 50 parts by weight of said substrate grafted with said superstrate, the total parts by weight of (A) and (B) being 100 parts,
C. from about 50 to 90 parts by weight of said plasticizer system per 100 parts by weight of (A) and (B),
D. from about 1 to 10 parts by weight of said stabilizer system per 100 parts by weight of (A) and (B), and E. from about 0.2 to 2.5 parts by weight of said lubricant system per 100 parts of weight of (A) and (B).

GRAFT COPOLYMER PREPARATION AND PROPERTIES

Example 1

This example illustrates the preparation of a butadiene-styrene rubber of the type used in the present invention.

A butadiene-styrene rubber, which contains 70 percent by weight of butadiene, and 30 percent by weight of styrene, is prepared using the following charge:

| | |
|---|---|
| Deaerated distilled water | 300 parts by weight |
| Rubber reserve doap (RRS) | 6.0 |
| Potassium chloride | 1.0 |
| Tert.-didecyl mercaptan (TDM) | 0.8 |
| Ethylene glycol dimethacrylate (EGDM) | 1.8 |
| Potassium sulfate ($K_2S_2O_8$) | 0.6 |
| Styrene | 60.0 |
| Butadiene (distilled) | 140.0 |

The above ingredients are charged to a reaction vessel, heated at 55°C. for 20 hours to a degree of conversion of 96%. The ethylene glycol dimethacrylate is used to crosslink the rubber. The resulting butadiene-styrene latices are characterized as follows:

| | |
|---|---|
| Solids | ~40% by weight |
| ph | 8.5–8.8 |
| Surface tension | 68–72 dynes/cm |
| Average particle size | 0.09 to 0.1 micron |
| Gel content | 89% to 93% |
| Swelling index | 12 – 16 |
| Refractive index $n_d^{25}$ | 1.5375 – 1.5395 |
| Tg | <–40°C. |

Example 2

This example illustrates the use of a two-stage graft polymerization reaction to prepare the grafted polymers of the present invention.

Twenty-five hundred parts of the latex prepared in Example 1 above, after dilution to 20 percent rubber solids and addition of 1 percent, by weight or rubber, of sodium lauryl sulfate, are charged to a reactor and heated under nitrogen and with agitation to about 60°C. An aqueous solution of 1.0 parts of sodium formaldehyde sulfoxylate and a small quantity of chelated iron is added before graft monomer addition. To this latex is continuously added over a one hour period a first monomer composition of 100 parts acrylonitrile, 200 parts styrene, 100 parts methyl methacrylate and 4 parts ethylene glycol dimethacrylate. During monomer addition, 1 part of potassium persulfate in aqueous solution is charged to the reactor. Stirring is continued during the addition of the first monomer composition and is continued for an additional period of one hour thereafter. Then, 0.8 part of sodium formaldehyde sulfoxylate and 0.8 part of potassium persulfate in aqueous solution is added to the latex and a second monomer composition of 130 parts acrylonitrile, 70 parts styrene and 2 parts tert-dodecyl mercaptan is continuously added to the reactor over a one-half hour period. Towards the end of the second monomer composition addition, a solution of 11 parts sodium lauryl sulfate is charged to the reactor, and agitation and heating are continued for about 30 minutes. The latex is then cooled to 25°C. and 5 parts of a conventional antioxidant is added to the batch. The latex is then coagulated in a hot aqueous magnesium sulfate solution, the coagulum is filtered, washed with water and dried. The crumb is fused and sheeted on a two-roll mill at 160°C. Thereafter test specimens are compression molded at 175°C. and 5000 psi for 5 minutes.

Optical properties on the molded specimens are determined in accordance with ASTM Test D-1003-52 and impact properties are determined in accordance with ASTM Test D-256-56. The properties of the test specimens are listed in Table I below.

Example 3 (Control)

For comparison a graft copolymer is prepared by a one step grafting procedure wherein the grafted superstrate is of substantially uniform composition throughout. In this test, the procedure of Example 2 is substantially repeated. However, to the 2500 parts of rubber latex, a mixture of 390 parts acrylonitrile, 210 parts styrene and 6 parts tert.-dodecyl mercaptan is added continuously over a ninety-minute period. The total amount of reducing agent and of persulfate used is the same as in Example 2. The latex is stirred at 60°C. for one hour after monomer addition and the graft copolymer is recovered, processed and molded as in Example 2. The properties of the test specimens are listed in Table I below.

Table I

| Property Tested | Example 2 Two-stage Graft | Example 3 Single Stage Graft |
|---|---|---|
| Tensile stress (psi) | | |
| at yield (10% strain/minute) | 2640 | 2910 |
| at failure (100% strain/minute) | 3630 | 3770 |
| Percent elongation | | |
| at yield | 4.0 | 4.6 |
| at failure | 197 | 121 |
| Tensile modulus (psi × $10^5$) | 1.15 | 1.27 |
| Percent haze (60 mil at 550 mm) | 2.8 | 3.5 |
| Yellowness index | 5.2 | 26.2 |
| Refractive index | 1.5435 | 1.5428 |

The above test results show the improved elongation at fail and optical properties which are obtained with the graft copolymers of the present invention.

Example 4

This example illustrates the preparation of three different two-stage graft copolymers. In Part A no difunctional monomer is used, in Part B the difunctional monomer is omitted from the first monomer mixture but included in the second monomer mixture, and in Part C the difunctional monomer is included in the first monomer mixture in accordance with the teachings of the present invention.

Each example uses a latex of a 70/30 butadiene/styrene rubbery copolymer having an average particle size of 0.151 microns, as determined by turbidity measurement, a gel content of 48.0 percent, a refractive index of 1.5381, a swelling index of 37.7 and a Tg less than −40°C. The two-stage grafting procedure is carried out at 50°C. using a persulfate/sulfoxylate/iron redox initiator system.

Part A (Control)

In this example the graft polymerization procedure of Example 2 is substantially repeated with the exception that the first monomer composition, which contains 50 percent by weight styrene, 25 percent methyl methacrylate and 25 percent acrylonitrile, does not contain a difunctional monomer.

Part B (Control)

In this example the first monomer composition is the same as in Part A above. However, the second monomer composition contains 65 percent by weight of acrylonitrile, 35 percent styrene and 0.5 percent by weight of allyl methacrylate difunctional monomer.

Part C

For comparison purposes a graft copolymer is prepared as in Parts A and B but using a first monomer composition containing 0.5 percent by weight of allyl methacrylate based on the total weight of monomers in the mixture.

Except for the presence or absence of a difunctional monomer, the composition of the first and second stage monomer mixtures and the graft ratios are the same for Parts A, D and C.

The graft copolymers are recovered by coagulation with calcium chloride and optical and mechanical properties are determined on compression molded specimens (125 mil thickness). The properties of the test specimens are found to be as follows:

|  | Part A (Control) | Copolymer Part B (Control) | Part C |
|---|---|---|---|
| Tensile stress (psi) | | | |
| at yield | no yield | 1690 | 2580 |
| at failure | 920 | 2000 | 3440 |
| Percent elongation | | | |
| at yield | — | 3.1 | 4.1 |
| at failure | 65 | 125 | 233 |
| Tensile modulus (psi × 10⁵) | 0.44 | 0.83 | 1.17 |
| Percent haze (550 mm) | 12.6 | 13.5 | 5.1 |
| Yellowness index | 11.8 | 13.1 | 12.0 |
| Refractive index, | | | | continued

|  | Part A (Control) | Copolymer Part B (Control) | Part C |
|---|---|---|---|
| $n_d^{25}$ | 1.5428 | 1.5430 | 1.5425 |

The tensile test results reported above indicate that the strength of the graft copolymer prepared in the absence of a difunctional monomer in the first graft monomer composition (Part A) is lower than that of the graft copolymer prepared by the method of the present invention using a difunctional monomer in the first monomer composition (Part C). The strength properties of the graft rubber obtained by a two-stage procedure using a difunctional monomer in the second monomer composition (Part B) are better than those of the graft copolymer, which contains no difunctional monomer (Part A), but still lower than those of the graft copolymer prepared using a difunctional monomer present in the first stage monomer composition (Part C).

POLYBLEND FORMULATIONS AND TEST DATA

Examples A–E

The following polyvinyl chloride polymers as shown in Table I are used in the preparation of polyblends of the invention.

Examples F–L

The following graft copolymers were tested as shown in Table II. Substrates of these graft copolymers have glass phase transition temperatures below 0°C.

TABLE I

VINYL CHLORIDE POLYMERS

| Ex. Des. | | Specific Viscosity₁ | Inherent Viscosity₂ | ASTM Classification₃ | Inherent Viscosity₇ | Polymerization Degree |
|---|---|---|---|---|---|---|
| A | Homopolyvinyl chloride (4) | 0.39 | 0.82 | C-P-3-16363 | | |
| B | Homopolyvinyl chloride (5) | 0.48 | 0.98 | C-P-5-15453 | | |
| C | Homopolyvinyl chloride (6) | 0.55 | 1.11 | C-P-6-15453 | | |
| D | Copolymer of 97 wt. % vinyl chloride and 3 wt. % vinyl acetate (8) | | | | 107 | |
| E | Homopolyvinyl chloride (9) | 0.69/0.70 | 1.34 to 1.37 | | | 2300 |

TABLE I — FOOTNOTES

1. Specific viscosity measured using a solution of 0.42 gm. polymer in 100 ml. cyclohexanone at 25°C.
2. Inherent viscosity measured using a solution of 0.2 weight percent polymer in cyclohexanone at 30°C.
3. ASTM classification according to ASTM test procedure D-1775-60T.
4. Polymer available commercially from Monsanto Company, St. Louis, Missouri, under that company's trademark "Opalon 630".
5. Polymer available commercially from Monsanto Company, St. Louis, Missouri, under that company's trademark "Opalon 650".
6. Polymer available commercially from Monsanto Company, St. Louis, Missouri, under that company's trademark "Opalon 660".
7. Inherent viscosity measured using a solution of 0.2 weight percent polymer in cyclohexanone at 25°C.
8. Polymer available commercially from Union Carbide Plastics Company under the trade designation VYNW.
9. Polymer available commercially from Monsanto Mitsubishi Kasei under the trade designation resin Sunprene KR-800.

TABLE II

GRAFT COPOLYMERS

| Ex. Des. | Substrate | Superstrate | Average Particle Size (microns) | Parts Graft/100 parts Substrate |
|---|---|---|---|---|
| F⁽¹⁾ | Homopoly- | 70 wgt. % | 0.9 | 95 |

TABLE II-continued

GRAFT COPOLYMERS

| Ex. Des. | Substrate | Superstrate | Average Particle Size (microns) | Parts Graft/100 parts Substrate |
|---|---|---|---|---|
| | butadiene | 30 wgt. % acrylonitrile | | |
| G[2] | Butadiene/acrylo-nitrile 93/7 copolymer | 70 wgt. % S 30 wgt. % AN | 0.14 | 90 |
| H[3] | Butadiene/Styrene 70/30 copolymer | Double Graft of Invention | 0.10 | 120 |
| I[4] | Butadiene/Styrene 70/30 | Single Graft Example 3 | 0.10 | 120 |
| J[5] | Butadiene/Styrene 70/30 | Double Graft Example 4A | 0.15 | 120 |
| K[6] | Butadiene/Styrene 70/30 | Double Graft Example 4B | 0.15 | 120 |
| L[7] | Butadiene/Styrene 70/30 | Double Graft Example 4C | 0.15 | 120 |

TABLE II — FOOTNOTES (1) Produced by mass/suspension polymerization according to U.S.P. 3,509,237, Example 1, Part B.
(2) Produced by emulsion polymerization according to U.S.P. 3,509,237, Example 1, Part A.
(3) Produced as in Example 2 of present specification, first graft of S/AN/MMA having weight percent ratio of 50/25/25 and second graft having S/AN of 35/65.
(4) Produced as in Example 3 of present specification single graft of S/AN having weight percent ratio of 35/65.
(5) Produced as in Example 4A having no difunctional monomer add but same double graft as Example 2.
(6) Produced as in Example 4B having difunctional monomer added in second monomer composition.
(7) Produced as in Example 4C having difunctional monomer added with first monomer composition.

EXAMPLES M-P

The following stabilizer systems as shown in Table III are used in the preparation of polyblends of this invention.

TABLE III

STABILIZER SYSTEMS

| Ex. Des. | Composition | Type | Physical Form |
|---|---|---|---|
| M | Tribasic lead sulfate[1] | Heat Stabilizer | Solid |
| N | Barium/Cadmium fatty acid salt[2] | Heat Stabilizer | Solid |
| O | Alkyl Aryl Phosphate | Chelator | Liqud |
| P | 4,4'-Butylidene-bis (6-t-butyl-m-cresol)[4] | Antioxidant | Solid |

TABLE III — FOOTNOTES (1) Available commercially as "Tribase XL" (TM) from N. L. Industries.
(2) Available commercially as "Mark 1260" (TM) from Argus Chemical Corporation, Subsidiary of Wittco Chemical Company.
(3) Available commercially as "Mark C" (TM) from Argus Chemical Corporation, Subsidiary of Wittco Chemical Company.
(4) Available commercially as "Santowhite Powder" (TM) from Monsanto Company.

EXAMPLES Q-X

The following plasticizers as shown in Table IV are used in the preparation of polyblends of this invention.

TABLE IV

PLASTICIZERS

| Ex. Des. | Composition | Physical Form |
|---|---|---|
| Q | Heptyl nonyl adipate[1] | Liquid |
| R | Heptyl nonyl tri mellitate[2] | Liquid |
| S | Di(isodecyl) phthalate[3] | Liquid |
| T | Di(heptyl, nonyl, undecyl) phthalate[4] | Liquid |
| U | Di(undecyl) phthalate[5] | Liquid |
| V | Di(isodecyl) adipate[6] | Liquid |
| W | Di(n-octyl, n-decyl) adipate[7] | Liquid |
| X | Di(n-octyl, n-decyl) phthalate[8] | Liquid |

TABLE IV — FOOTNOTES (1) Available commercially as "Santicizer 97A" (TM).*
(2) Available commercially as "Santicizer 79TM" (TM).*
(3) Available commercially as DIDP from Monsanto Company.
(4) Available commercially as "Santicizer 711" from Monsanto Company.
(5) Available commercially as "DUP" from Monsanto Company.
(6) Available commercially as "DIDA" from Monsanto Company.
(7) Available commercially as "DNODA" from Monsanto Company.
(8) Available commercially as "DNODP" from Monsanto Company.
* Monsanto Company

EXAMPLES Y – Z

The following lubricants as shown in Table V are used in the preparation of polyblends of this invention.

TABLE V

LUBRICANTS

| Ex. Des. | Composition | Physical Form |
|---|---|---|
| Y | Dibasic lead stearate[1] | Solid |
| Z | Stearic Acid[2] | Solid |

TABLE V – FOOTNOTES (1) Available commercially as "DS-207" from N. L. Industries.
(2) Available commercially from Wittco Chemical Company.

EXAMPLES 5 – 27

The above components of each Example A through Z respectively are utilized in a series of polyblends of this invention. Each polyblend is then formed into a test member and tested for hardness and flex fatigue.

The procedures involve mixing together the respective components of each polyblend together in blending operation until substantial uniformity of intermixing occurs by blending in a ribbon blender. Then each blend is Banburied and mill rolled at 185°C. and diced in a Ball and Jewel Cutter and compression molded at 365°F. (185°C.) into samples and tested for Shore A Hardness according to ASTM D-676 and cracks propagation resistance according to ASTM D-1052 at −20°F. (−7°C.) samples having a 1/10 inch notch recording flex cycles to fail. The polyblend compounds were also screw injection molded into unitary sole and heel moldings at 365°F. (185°C.) to determine the injection molding properties of the polyblend.

The screw injection molding machine was run with an injection pressure of 1000 psi, a screw speed of 100 rpm and a mold temperature of 70°F. and a clamping pressure of 2000 psi. The molding machine used was a Batawa Engineering Machine, Solpak Model MK-1 available from the Batawa Engineering Company, Montreal, Ontario, Canada. Those unitary sole-heel moldings having a Flex crack resistance greater than 2000 pass the industry standard, however, those having the composition of this invention, in particular, the double graft copolymers as shown by component H and L had superior Flex crack resistance and unitary sole-heel properties.

It is evident from the test data that:
1. The PVC plasticized composition containing no graft copolymers (Exp. 28) had poor Flex crack properties failing the test.
2. The PVC polyblends having single graft copolymers of large rubber particle size (Exp. 5) had poor Flex crack resistance failing the test.
3. The PVC polyblends having single graft copolymers of small rubber particle size (Exps. 6 and 8) had passing but relatively less Flex crack resistance.
4. The PVC polyblends having double graft copolymers ranging from 20 to 50 parts (Exps. 7, 11–27) show superior Flex crack resistance.
5. The PVC polyblends having PVC polymers with a range of inherent viscosities from 0.7 to 1.5 (Exps. 12, 15–18) provide high Flex crack resistance.
6. The PVC polyblends having a plasticizer system based on adipate, phthalate, and trimellitate esters of straight and branched chain alkyl alcohols (Exps. 15–23) have superior Flex crack resistance.

TABLE VI

EXAMPLES 5 – 16

| Component or Property | 5 | 6 | 7 | 8 | 9 | 10 | 11 | 12 | 13 | 14 | 15 | 16 |
|---|---|---|---|---|---|---|---|---|---|---|---|---|
| A | 70 | 70 | 70 | 70 | 70 | 70 | 70 | 65 | 80 | 50 | | |
| B | | | | | | | | | | | 65 | |
| C | | | | | | | | | | | | 65 |
| D | | | | | | | | | | | | |
| E | | | | | | | | | | | | |
| F | 30 | | | | | | | | | | | |
| G | | 30 | | | | | | | | | | |
| H | | | 30 | | | | | | 35 | 20 | 50 | 35 | 35 |
| I | | | | 30 | | | | | | | | |
| J | | | | | 30 | | | | | | | |
| K | | | | | | 30 | | | | | | |
| L | | | | | | | 30 | | | | | |
| M | | | | | | | | | | | | |
| N | 2.5 | 2.5 | 2.5 | 2.5 | 2.5 | 2.5 | 2.5 | 2.5 | 2.5 | 2.5 | 2.5 | 2.5 |
| O | 0.5 | 0.5 | 0.5 | 0.5 | 0.5 | 0.5 | 0.5 | 0.5 | 0.5 | 0.5 | 0.5 | 0.5 |
| P | 0.5 | 0.5 | 0.5 | 0.5 | 0.5 | 0.5 | 0.5 | 0.5 | 0.5 | 0.5 | 0.5 | 0.5 |
| Q | | | | | | | | | | | | |
| R | | | | | | | | | | | | |
| S | | | | | | | | | | | | |
| T | 73 | 73 | 73 | 73 | 73 | 73 | 73 | 73 | 73 | 73 | 73 | 73 |
| U | | | | | | | | | | | | |
| V | | | | | | | | | | | | |
| W | | | | | | | | | | | | |
| X | | | | | | | | | | | | |
| Y | | | | | | | | | | | | |
| Z | .75 | .75 | .75 | .75 | .75 | .75 | .75 | .75 | .75 | .75 | .75 | .75 |
| Shore A (10 sec.) Hardness | 60 | 78 | 77 | 78 | 80 | 79 | 77 | 76 | 72 | 85 | 76 | 77 |
| Flex Crack Resistance* | NG | 2 | 20+ | 3 | 4 | 6 | 20+ | 20+ | 7 | 11 | 20+ | 20+ |

EXAMPLES 17 – 28

| Component or Property | 17 | 18 | 19 | 20 | 21 | 22 | 23 | 24 | 25 | 26 | 27 | 28 |
|---|---|---|---|---|---|---|---|---|---|---|---|---|
| A | 50 | | 65 | 65 | 65 | 65 | 65 | 65 | 65 | 65 | 65 | 100 |
| B | | | | | | | | | | | | |
| C | | | | | | | | | | | | |
| D | 15 | | | | | | | | | | | |
| E | | 65 | | | | | | | | | | |
| F | | | | | | | | | | | | |
| G | | | | | | | | | | | | |
| H | 35 | 35 | 35 | 35 | 35 | 35 | 35 | 35 | 35 | 35 | 35 | |
| I | | | | | | | | | | | | |
| J | | | | | | | | | | | | |
| K | | | | | | | | | | | | |
| L | | | | | | | | | | | | |
| M | | | | | | | | | | | | |
| N | 2.5 | 2.5 | 2.5 | 2.5 | 2.5 | 2.5 | 2.5 | 2.5 | 2.5 | 2.5 | 2.5 | 2.5 |
| O | 0.5 | 0.5 | 0.5 | 0.5 | 0.5 | 0.5 | 0.5 | 0.5 | 0.5 | 0.5 | 0.5 | 0.5 |
| P | 0.5 | 0.5 | 0.5 | 0.5 | 0.5 | 0.5 | 0.5 | 0.5 | 0.5 | 0.5 | 0.5 | 0.5 |
| Q | | | | | 70 | | | | | | | |
| R | | | | | | 70 | | | | | | |
| S | | | | | | | 70 | | | | | |

TABLE VI-continued

EXAMPLES 5 - 16

| Component or Property | 5 | 6 | 7 | 8 | 9 | 10 | 11 | 12 | 13 | 14 | 15 | 16 |
|---|---|---|---|---|---|---|---|---|---|---|---|---|
| T | 73 | 73 | 45 | 90 | | | | | | | 70 | |
| U | | | | | | | 70 | | | | | |
| V | | | | | | | | 70 | | | | |
| W | | | | | | | | | 70 | | | |
| X | | | | | | | | | | 70 | | |
| Y | | | | | | | | | | | | |
| Z | .75 | .75 | .75 | .75 | .75 | .75 | .75 | .75 | .75 | .75 | .75 | .75 |
| Shore A (10 sec.) Hardness | 72 | 78 | 94 | 55 | 66 | 75 | 74 | 72 | 71 | 66 | 76 | 70 |
| Flex Crack Resistance* | 3 | 20+ | 3 | 20+ | 14 | 12 | 6 | 17 | 4 | 14 | 20+ | NG |

*Ross Flex Crack Resistance Test (ASTM D-1052) to crack × 10³

What is claimed is:

1. A polymer composition comprising:
  A. from about 50 to 80 parts by weight of a polyvinyl chloride polymer being characterized by having an inherent viscosity of from about 0.7 to 1.5 in a 0.2 weight percent cyclohexanone solution at about 25° to 30°C., said polyvinyl chloride polymer comprising a polymer selected from the group consisting of homopolyvinyl chloride and polyvinyl chloride copolymers having up to 25 weight percent of another ethylenically unsaturated comonomer polymerizable therewith,
  B. a butadiene-styrene rubbery substrate having a butadiene content of 68 to 95 percent by weight and a styrene content of 5 to 32 percent by weight based on the total weight of the butadiene-styrene rubbery substrate which rubbery substrate is further characterized as having a particle size in the range of from 0.06 to 0.2 micron, a gel content in the range of from 40 to 95 percent, a swelling index in the range of from 10 to 40, and a second order transition temperature (Tg) less than −40°C.,
  C. A superstrate grafted onto the rubber substrate which superstrate comprises:
    1. the polymerization product of a first polymerizable monomer composition comprising:
      a. from 0.1 to 2 percent by weight of a nonconjugated diolefin monomer,
      b. from 20 to 30 percent by weight of an ethylenically unsaturated nitrile selected from the group consisting of acrylonitrile, and mixtures of acrylonitrile and methacrylonitrile which contain up to 20 percent by weight of methacrylonitrile,
      c. from 40 to 60 percent by weight of a vinylidene aromatic hydrocarbon monomer selected from the group consisting of styrene and alpha methyl styrene,
      d. from 20 to 50 percent by weight of methyl methacrylate, and
    2. the polymerization product of a second polymerizable monomer composition comprising from 55 to 85 percent by weight of an ethylenically unsaturated nitrile monomer selected from the group consisting of acrylonitrile and mixtures of acrylonitrile and methacrylonitrile which contains up to 20 percent by weight of methacrylonitrile based on the total weight of acrylonitrile and methacrylonitrile and from 15 to 45 percent by weight of a monovinylidene aromatic hydrocarbon monomer wherein the percent by weight is based on the total weight of the monomers in the second polymerizable monomer mixture;
  wherein the grafted superstrate contains a total of at least 40 percent by weight ethylenically unsaturated nitrile monomer and wherein the ratio of grafted superstrate to substrate is in the range of from 15–200:100 wherein (B) plus (C) are present in from about 20 to 50 parts by weight, the total parts by weight of (A), (B) and (C) being 100 parts,
  D. a plasticizer system for said polymer composition, said plasticizer system being present in a sufficient amount to produce in said polymer composition after such is heat fused at a temperature of from about 120° to 215°C., a Shore A hardness value in the range of from about 45 to 95 at about 23°C.,
  E. a stabilizer system for said polymeric composition, said stabilizer system being present in such amounts as to substantially prevent the thermal degradation of said polymeric composition during heat fusion for 5 to 15 minutes at temperatures in the range of from about 120° to 215°C., and
  F. a lubricant system present in such amounts as to permit the release of said polymeric composition from a heated solid surface after said polymeric composition has been heat fused at temperatures in the range of from about 120° to 215°C.

2. A polymeric composition of claim 1, wherein the first polymerizable monomer mixture comprises acrylonitrile, styrene, methyl methacrylate and ethylene glycol dimethacrylate.

3. A polymeric composition of claim 1, wherein the second polymerizable monomer mixture comprises acrylonitrile and styrene.

4. A polymeric composition of claim 1, wherein the nitrile monomer used in the first polymerizable monomer is a mixture of acrylonitrile and methacrylonitrile.

5. A polymeric composition of claim 1, wherein the nitrile monomer used in the second polymerizable monomer is a mixture of acrylonitrile and methacrylonitrile.

6. A polymeric composition of claim 1, wherein up to 5 percent by weight of the butadiene in the rubbery substrate is replaced with acrylonitrile.

7. A polymer composition of claim 1 comprising:
  A. from about 50 to 80 parts by weight of a homopolyvinyl chloride, said homopolyvinyl chloride polymer being characterized by having an inherent viscosity of from about 0.70 to 1.5 in a 0.2 weight percent cyclohexanone solution at about 25° to 30°C., B. from about 20 to 50 parts by weight of said substrate grafted with said superstrate, the total parts by weight of (A) and (B) being 100 parts,
C. from about 50 to 90 parts by weight of said plasticizer system per 100 parts by weight of (A) and (B),
D. from about 1 to 10 parts by weight of said stabilizer system per 100 parts by weight of (A) and (B),
E. from about 0.2 to 2.5 parts by weight of said lubricant system per 100 parts of weight of (A) and (B).

8. A polymeric composition of claim 7, wherein the first polymerizable monomer mixture comprises acrylonitrile, styrene, methyl methacrylate and ethylene glycol dimethacrylate.

9. A polymeric composition of claim 7, wherein the second polymerizable monomer mixture comprises acrylonitrile and styrene.

10. A polymeric composition of claim 7, wherein the nitrile monomer used in the first polymerizable monomer is a mixture of acrylonitrile and methacrylonitrile.

11. A polymeric composition of claim 7, wherein the nitrile monomer used in the second polymerizable monomer is a mixture of acrylonitrile and methacrylonitrile.

12. A polymeric composition of claim 7, wherein up to 5 percent by weight of the butadiene in the rubbery substrate is replaced with acrylonitrile.

13. A polymeric composition of claim 7, wherein said plasticizer system is selected from the group consisting of dibasic and tribasic esters with straight and branched alkyl alcohols having 3 to 13 carbon atoms and mixtures thereof.

14. A polymeric composition of claim 7, wherein said plasticizer system is selected from the group consisting of adipate, phthalate and trimellitate esters with straight and branched alkyl alcohols having 3 to 13 carbon atoms and mixtures thereof.

15. A polymeric composition of claim 7, wherein said plasticizer system is selected from the group consisting of di(heptyl, nonyl, undecyl) phthalate, di(n-octyl decyl) phthalate, di(undecyl) phthalate, heptyl nonyl trimellitate, heptyl, nonyl adipate, di(n-octyl, decyl) adipate or mixtures of the same.

16. A polymeric composition of claim 7, wherein the plasticizer system is di(heptyl, nonyl, undecyl) phthalate.

17. A polymeric composition of claim 7, wherein said stabilizer system is selected from the group consisting of tribasic lead sulfate, barium, cadmium fatty acid salt, alkyl aryl phosphate and 4,4'-butylidene-bis (6-t-butyl-m-cresol) or mixtures thereof.

18. A polymeric composition of claim 7, wherein said lubricant system is selected from the group consisting of dibasic lead stearate and stearic acid and mixtures thereof.

19. A polymeric composition of claim 1, wherein said nonconjugated diolefin monomer is selected from the group consisting of divinyl benzene, ethylene, dimethacrylate, ethylene glycol dimethacrylate and diarylate, polyethylene glycol dimethacrylates and diacrylates, allyl acrylates, diallyl fumarate, diallyl maleate, vinyl crotonate and nonconjugated alpha-omega diolefins of at least 5 carbon atoms and mixtures of the same.

20. A polymeric composition of claim 1, wherein said nonconjugated diolefin monomer is ethylene glycol dimethacrylate.

* * * * *